Nov. 14, 1967  W. B. SEIDEL  3,352,611
PRELOADING MECHANISM FOR MACHINE TOOL SPINDLE BEARINGS
Filed Sept. 1, 1965  2 Sheets-Sheet 1
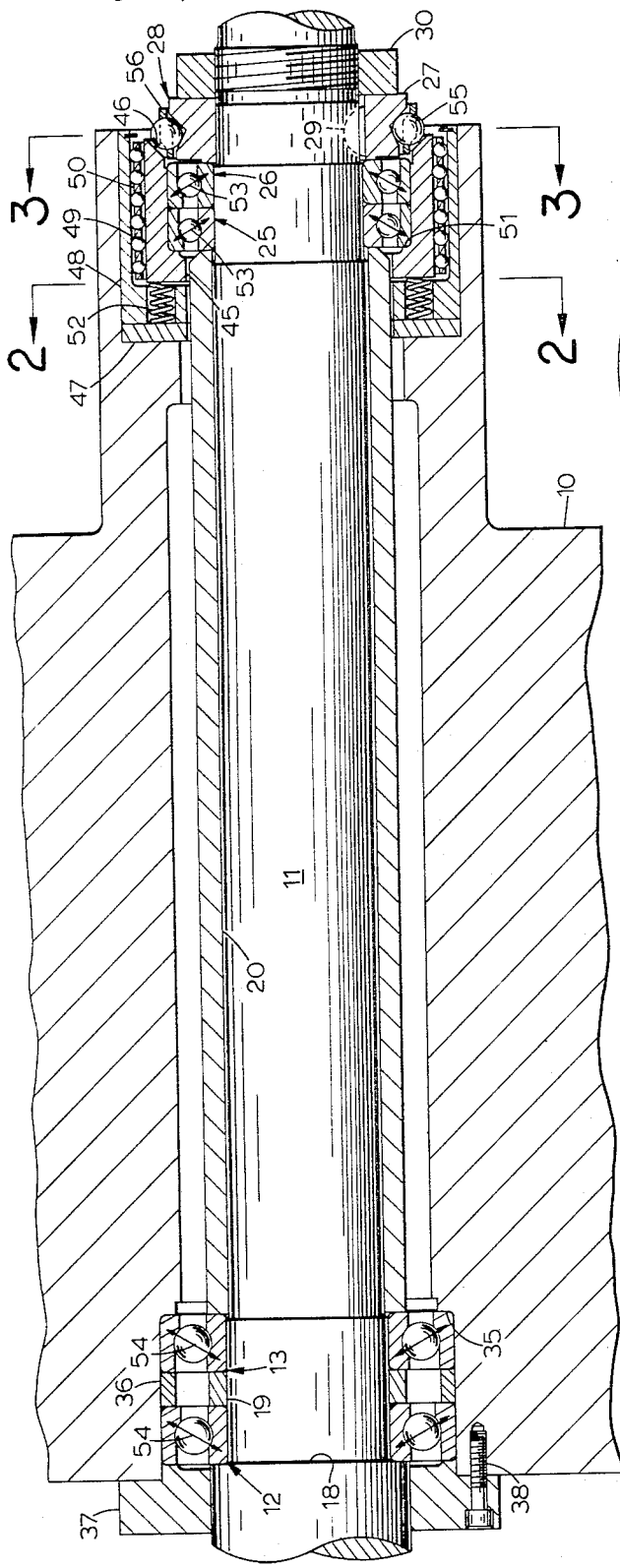
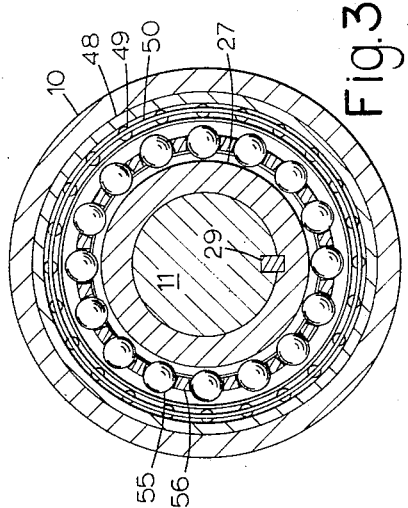
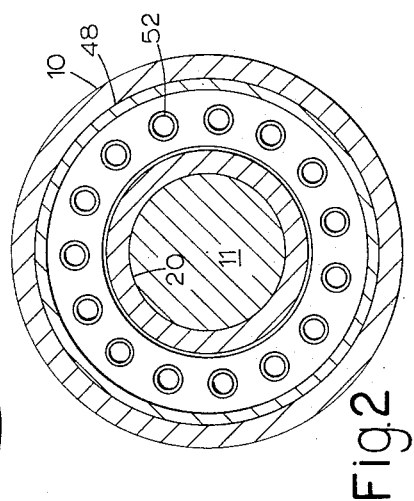
INVENTOR.
WILLIAM B. SEIDEL
BY Howard T. Heiser
& John F. Verhoeven
ATTORNEYS Nov. 14, 1967  W. B. SEIDEL  3,352,611
PRELOADING MECHANISM FOR MACHINE TOOL SPINDLE BEARINGS
Filed Sept. 1, 1965  2 Sheets-Sheet 2
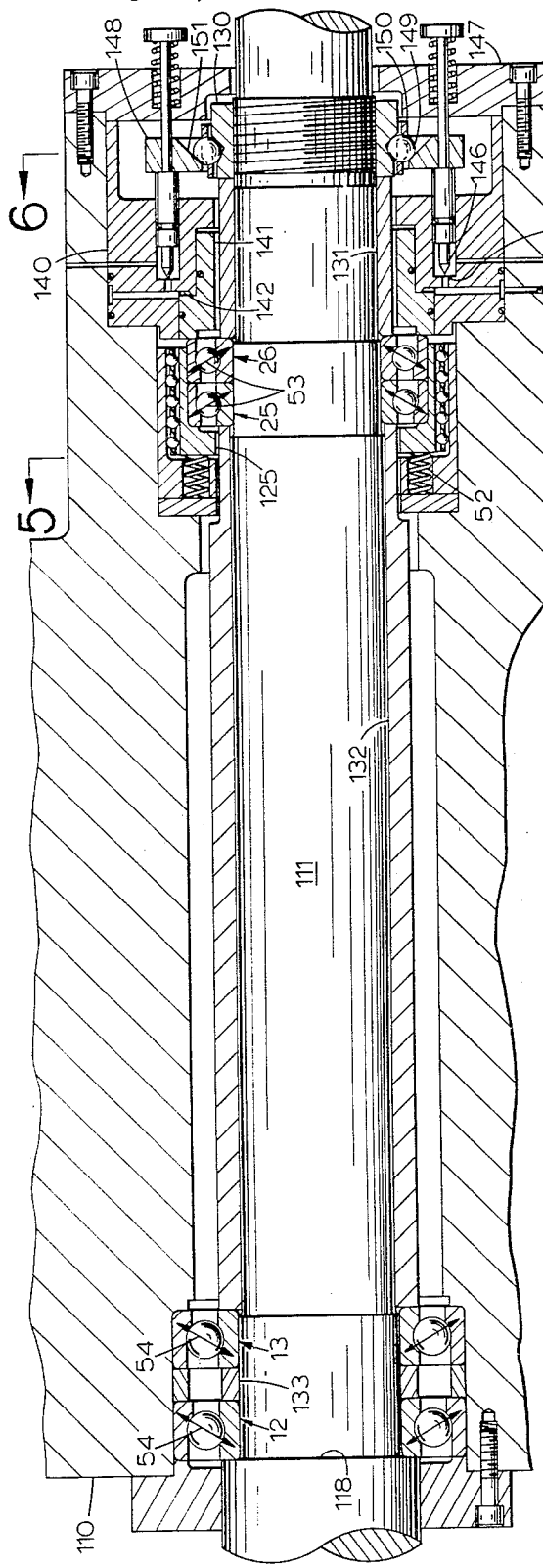
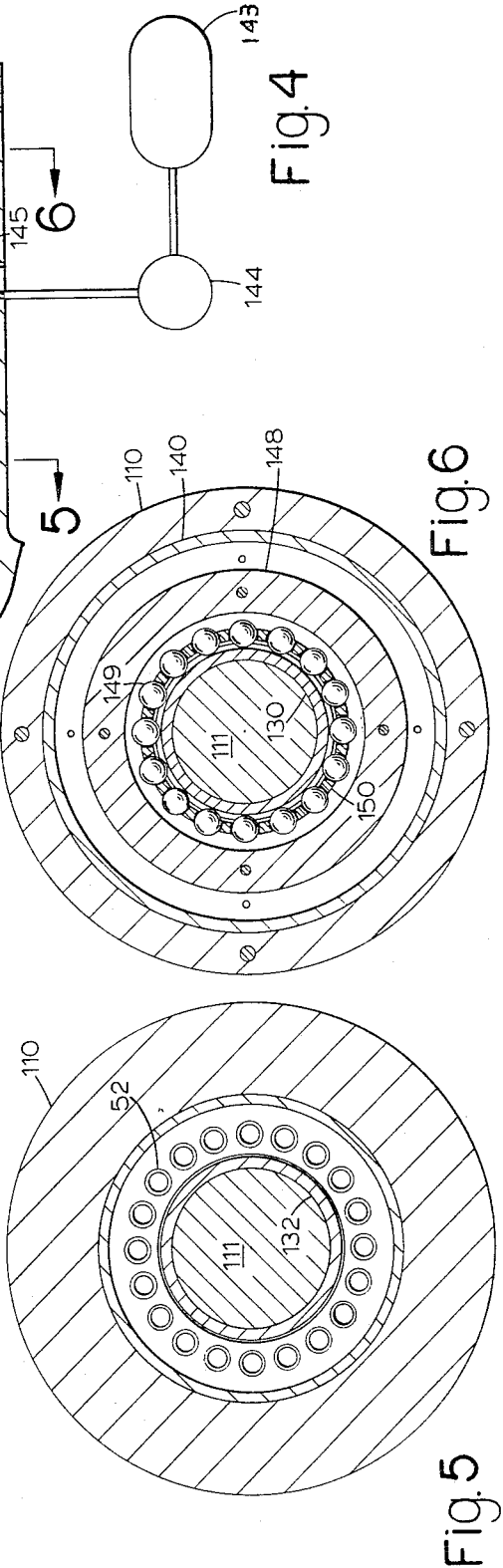
Fig. 4
Fig. 5
Fig. 6

United States Patent Office 3,352,611
Patented Nov. 14, 1967

3,352,611
PRELOADING MECHANISM FOR MACHINE TOOL SPINDLE BEARINGS
William B. Seidel, Cincinnati, Ohio, assignor to The Cincinnati Milling Machine Co., Cincinnati, Ohio, a corporation of Ohio
Filed Sept. 1, 1965, Ser. No. 484,285
5 Claims. (Cl. 308—189)

ABSTRACT OF THE DISCLOSURE

A machine tool spindle and supporting bearings including a mechanism having an inertia ball actuator responding to speed of spindle rotation and operating to vary the axial preload of the bearings in response to the speed of spindle rotation either by direct mechanical linkage or by control of a hydraulic apparatus.

---

The axial loading of an anti-friction bearing, such as a ball bearing, consists of axially biasing one race, such as the outer race, relative to the inner race. When this is done, a force is transmitted from one race to the balls and from the balls to the other race. These forces tend to hold the balls tightly between the races, and the greater the axial loading, the more tightly the balls are held. The outer race is tightly secured in a housing and the inner race is tightly secured on the spindle. Thus, the more tightly the balls are held between the races, the more rigidly the spindle is mounted in the housing. At the same time, however, the more tightly the balls are held between the races, the more wear experienced by the bearings. The tendency of the bearings to wear increases as the speed of the spindle increases. Normally, heavy cuts are taken at low spindle speeds, and it is therefore desirable to have high axial loading on the bearings for heavy cuts. Lighter cuts are taken at higher speeds and less rigidity is needed. In order to keep the wear from becoming excessive, less axial loading on the bearings is desirable for light cuts at high speed. Accordingly, it is known to increase the axial loading on the bearings at low spindle speed and to decrease the axial loading on the bearings at high speeds.

In the present invention, the axial loading on the spindle bearings is adjusted automatically by the speed of the spindle. This is accomplished by members, preferably balls, mounted on the spindle, the members being movable with respect to the spindle and urged radially outwardly by centrifugal force when the spindle rotates, the faster the rotation, the greater the force. In the preferred form of the invention, the outer race of a spindle bearing is biased, or pre-loaded, by springs with respect to the inner race. In one embodiment of the invention, the force of the balls, acting through a wedge member, reduces the bias of the springs on the outer race to reduce the loading on the spindle bearings. In another embodiment of the invention, the force of the balls operates a valve member which controls fluid pressure to reduce the bias of the springs on the outer race and reduce the loading on the spindle bearings.

It is therefore one object of the present invention to provide improved spindle loading mechanism responsive to the speed of rotation of the spindle. It is another object to provide mechanism operable in response to the centrifugal force of members on the spindle to vary the loading on the spindle bearings. It is still another object of the present invention to provide a control member on the spindle, operable in response to the speed of the spindle, to control fluid pressure for varying the loading on the spindle bearings. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:
FIG. 1 is a view in cross-section showing the preferred embodiment of the present invention;
FIGS. 2 and 3 are views taken on the lines 2—2 and 3—3 of FIG. 1;
FIG. 4 is a view in cross-section showing another embodiment of the present invention; and
FIGS. 5 and 6 are views taken on the lines 5—5 and 6—6 of FIG. 4.

There is shown in FIG. 1 a housing 10 for the spindle 11 of a machine tool. The spindle 11 is adapted to receive different type tools, some of which are rotated at a slow speed to take a heavy cut, such as a milling cut, and some of which are rotated at a high speed to take a light cut, such as a drilling cut.

One end of the spindle 11 is received in two ball bearings, indicated generally at 12 and 13. The spindle 11 has a shoulder 18 which bears against the inner race of bearing 12. A spacer 19 is received between the inner races of bearings 12 and 13. The inner race of bearing 13 bears against a sleeve 20. The other end of the spindle 11 is received in two ball bearings indicated generally at 25, 26. The inner race of bearing 25 bears against sleeve 20. The inner race of bearing 26 is sandwiched between the inner race of bearing 25 and the ring 27 of an actuating member indicated generally at 28. The ring 27, which is keyed to the spindle at 29, is held on spindle 11 by nut 30. The inner races of bearings 12, 13, 25, and 26 are tightly held on the spindle by the clamping force exerted between the nut 30 and shoulder 18. The outer race of bearing 13 bears against shoulder 35 in the housing 10. A spacer 36 is received between the outer races of bearings 12 and 13. An end cap 37 bears against the outer race of bearing 12. Screws 38 secure the end cap to the housing 10 to hold the outer races of bearings 12 and 13 tightly in the housing.

The outer races of bearings 25, 26 are received inside a wedge member 45 having an inclined wedge surface 46 at one end. A plate 47 and a cup shaped member 48 are tightly received in the housing 10. The wedge member 45 is mounted in the cup shaped member 48 for axial movement therein by means of ball bearings 49 received in a cylindrical guide 50. The wedge member 45 has a shoulder 51 bearing against the outer race of bearing 25. Springs 52, which seat on plate 47 and extend through holes in cup shaped member 48, urge wedge member 45 to the right (as viewed in FIG. 1) and bias the outer races of bearings 25 and 26 relative to the inner races thereof. The loading force created by springs 52 acts through bearings 25 and 26 as indicated by arrows 53. This force tends to urge the spindle 11 to the right (as viewed in FIG. 1) to transmit a force from the inner races of bearings 12 and 13 to the outer races thereof, as indicated by the arrows 54. The forces represented by arrows 53 result from biasing the outer race of bearings 25, 26 with respect to the inner races thereof, and these forces load the bearings 25, 26 to the extent the force of springs 52 is transmitted to the outer races of the bearings 25, 26. The forces represented by arrows 54 result from biasing the inner races of bearings 12, 13 with respect to the outer races thereof, and these forces load the bearings 12, 13 to the same extent the bearings 25, 26 are loaded.

The ring 27 of actuating member 28 has a groove in which a circle of balls 55, in ball guide 56, are received.

When the spindle 11 is not rotating, the balls 55 exert no significant pressure on wedge member 45. Thus, the full force of springs 52 load the bearings of spindle 11 and maintain the spindle rigid. At high speeds of rotation, the balls, which are urged outwardly by centrifugal force, exert a force on the wedge member 45 opposing the force of the springs 52. This force exerted by the balls significantly reduces the loading on the bearings 25, 26, 12, 13. At low speeds, the force exerted by the balls is lower, and the loading force on the four bearings is therefore higher. Thus, the loading force on the bearings 12, 13, 25, 26 is inversely proportional to the speed of the spindle.

In another embodiment of the invention, the bearings 12, 13, 25, and 26 are loaded by springs in the same manner as in the embodiment previously described. However, instead of an actuator member acting directly to oppose the force of springs 52, a control member is provided to control the hydraulic pressure on a piston which opposes the springs 52. In this embodiment, the outer races of bearings 25, 26 are biased by a member 125 corresponding to the wedge member 45 in the previous embodiment. The inner races of the four bearings are held tightly on a spindle 111, between shoulder 118 and a nut 130, by sleeves 131 and 132, and spacer 133.

A cylinder 140 is securely received in the housing and has a piston 141 slidably received therein. The cylinder has a chamber 142 in communication with a source of pressure comprising tank 143 and pressure regulating valve 144. The chamber is also in communication with outlet orifices 145 which are in registration with movable valve members 146. The movable valve members are mounted in a plate 147 connected to the housing 110. The movable valve members 146 abut against and pass through a wedge ring 148 so that axial movement of the wedge ring will produce axial movement of the valve members.

A circle of balls 149, in a guide ring 150, are mounted in a groove in nut 130 to define a wedge actuating unit. The balls, which are in registration with wedge surface 151 on wedge ring 148, exert no force on that surface when the spindle is at rest. Under these conditions, all the air from the pressure source is exhausted through the outlets 145, and no pressure is built up in chamber 142. The piston 141, which bears against the outer race of bearing 26, exerts no force at this time, and the full force of the springs 52 load the bearings as indicated by arrows 53, 54. When the spindle rotates at high speed, the centrifugal force of the balls moves the ring 148, and valve members 146, to the left, closing the outlets 145. When this occurs, pressure builds up in chamber 142, urging piston 141 to the left. Thus, the balls, wedge ring, and valve members constitute a control unit which controls the piston 141 and the loading on the bearings. The greater the speed of the spindle, the greater the force urging the upper races of bearings 25, 26 to the left, in opposition to the force of the springs 52. This reduces the loading on the bearings as the speed of the spindle increases. The slower the speed of the spindle, the less the force of the piston urging the upper races of bearings 25, 26 to the left and the greater the loading on the bearings.

What is claimed is:
1. In a machine tool:
(a) a spindle,
(b) a bearing to support the spindle for rotation in an axis,
(c) means for producing a predetermined axial preload on the bearing,
(d) a wedge member shiftable axially relative to the spindle and operable thereby to alter the loading on the bearing produced by said means, and
(e) a wedge actuating unit mounted on the spindle, said actuating unit having a member movable radially with respect to the spindle axis to operate the wedge member on rotation of the spindle.

2. In a machine tool:
(a) a housing,
(b) a spindle,
(c) a bearing to support the spindle in the housing for rotation in an axis,
(d) means for producing a predetermined axial preload on the bearing,
(e) a wedge member received around the spindle and shiftable axially in the housing to alter the preloading on the bearing, and
(f) a wedge actuating unit mounted on the spindle and having a plurality of balls engaged with the wedge member, said balls urged radially outwardly on rotation of the spindle to shift the wedge member axially.

3. In a machine tool:
(a) a spindle,
(b) a pair of bearings to support the spindle for rotation in an axis,
(c) a wedge member received on the spindle and operable when shifted axially to alter the loading on the bearing, and
(d) a wedge actuating unit mounted on the spindle and having a circle of balls engaged with the wedge member, said balls urged radially outwardly against the wedge member on rotation of the spindle with a force increasing as the speed of the spindle increases to shift the wedge member axially and decrease the load on said bearings.

4. In a machine tool:
(a) a spindle,
(b) a pair of bearings to support the spindle for rotation in an axis,
(c) a spring to load the bearings,
(d) a wedge member received on the spindle and operable when shifted axially to alter the force of the spring transmitted to the bearings,
(e) a wedge actuating unit mounted on the spindle and having a circle of balls engaged with the wedge member, said balls urged radially outwardly against the wedge member on rotation of the spindle with a force increasing as the speed of the spindle increases to shift the wedge member axially and decrease the spring load on said bearings.

5. The apparatus of claim 2 wherein:
(a) a piston is included in the housing and is axially shiftable to vary the load provided by said means, and
(b) a fluid control valve is included and mechanically linked with said wedge member to respond to shifting thereof to direct fluid against one side of the piston under a pressure controlled by the valve.

References Cited

UNITED STATES PATENTS 1,859,334   5/1932   Karle _____ 192—105

MARTIN P. SCHWADRON, *Primary Examiner.*

FRANK SUSKO, *Examiner.*